W. H. SMITH.
Projectile.
No. 1,788. Reissued Oct. 4, 1864.
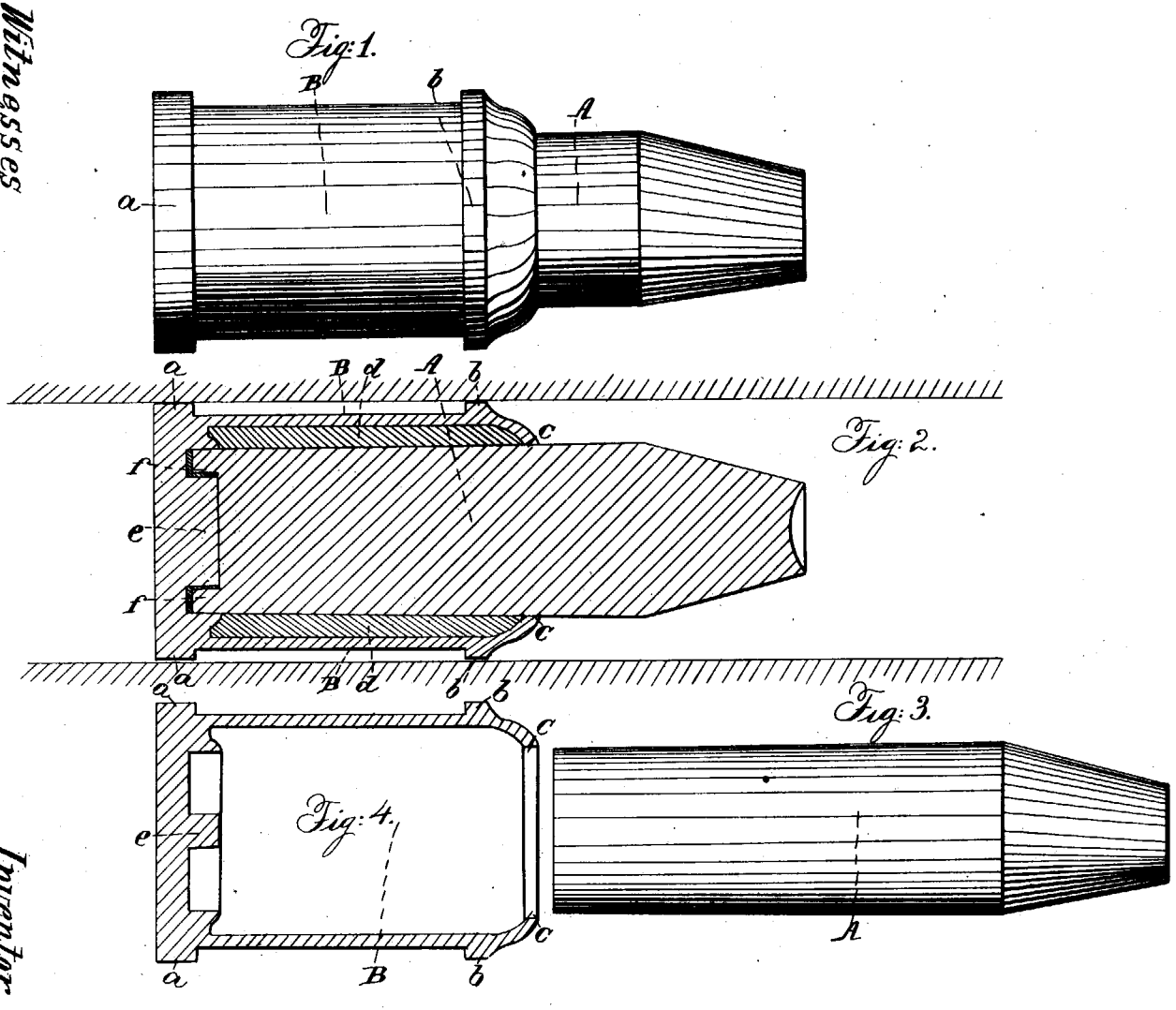
Witnesses
J. W. Coombs
Geo. Reed
Inventor:
W. H. Smith
per Munn & Co
Attorneys
N. PETERS, PHOTO-LITHOGRAPHER, WASHINGTON, D. C.

UNITED STATES PATENT OFFICE.

W. H. SMITH, OF BIRMINGHAM, CONNECTICUT, ASSIGNOR TO HIMSELF AND ROYAL M. BASSETT.

IMPROVEMENT IN PROJECTILES FOR RIFLED ORDNANCE.

Specification forming part of Letters Patent No. 37,260, dated December 23, 1862; Reissue No. 1,788, dated October 4, 1864.

DIVISION B.

*To all whom it may concern:*

Be it known that I, W. H. SMITH, of Birmingham, of the county of New Haven and State of Connecticut, have invented certain new and useful Improvements in Projectiles for Ordnance; and I do hereby declare the following to be a full, clear, and exact description thereof, reference being had to the accompanying drawings, and to the letters of reference marked thereon.

My present invention relates to that kind of projectile which I designate "sub-caliber"—that is, a projectile which is formed of a penetrating body or missile much smaller than the bore of the gun from which it is to be discharged, and surrounded or otherwise combined with a holding device, which is equal in diameter to the bore of the gun from which it is to be fired, and which holds the smaller portion of the projectile centrally in the bore of the gun and guides it during its flight through the gun, (and accompanies it until some resisting object is met which can be penetrated only by the central portion or body of the projectile.)

In another application filed simultaneously with this I have fully described the objects and advantages of this kind of projectile, and made a broad claim thereto. Therefore, and since the peculiarities of construction of a sub-caliber shot constitute the subject-matter of this application, it is unnecessary for me here to enter minutely into the subject of a sub-caliber projectile.

In a sub-caliber projectile it is of vital importance that while the device employed for holding the bolt or body of the shot centrally in the bore of the gun be made as light as possible it shall also be exceedingly strong, and so formed as to resist the great and sudden strain exerted against it by the force of the explosion of the charge, and perfectly perform its functions of holding and guiding the body of the shot through the gun, and imparting to it its velocity and also its rotary motion; and it is also necessary that the body or bolt be so shaped and so arranged with the centralizing case or holder that the body will easily discharge itself from the case or jacket when a solid object is struck and penetrated by the body alone.

To attain these desirable ends and produce a practically successful sub-caliber projectile are the objects of my present invention; and to these ends my invention consists in the employment, in combination with the central bolt or body of a sub-caliber projectile, of a centering holder case or jacket of metal having its forward and rear ends made to fit the bore of the gun, and also fit to the body or bolt to center and hold the latter, and these two centering portions permanently connected together, as will be more fully described hereinafter.

To enable those skilled to make and use my invention, I will proceed to describe the construction and operation of one of my new projectiles, referring by letters to the accompanying drawings, making part of this application, in which—

Figure 1 is a longitudinal elevation of one of my new projectiles. Fig. 2 is an axial longitudinal section of the same. Fig. 3 is a longitudinal elevation of the projectile or shot proper detached from the case, and Fig. 4 is a longitudinal central section of the case detached from the bolt or shot proper.

In the several figures I have indicated the same part by the same letter of reference.

A is the body of the projectile or shot proper, which may be either solid or hollow for use as a "shell," as desired. This body A, I propose to make of steel or other suitably hard material, of cylindrical or nearly cylindrical form from end to end; or its forward end may be so shaped otherwise as may be deemed most expedient to insure the readiest penetration. In the drawings I have shown this body A as being slightly tapered from its head toward its rear end, and as having its head of the form of a truncated cone or frustum of a cone with its smaller base (the forward extreme end of body) concave, so as to form a sort of chisel-edge.

B is a jacket or case made to cover the rear end of and extend along over the body A during the greater portion of its length. This jacket or case B has a portion of its circumference or periphery at *a*, close to its bottom or rear, and another portion of its periphery at *b*, near its front end, turned to fit easily to the bore of the gun, (to which the finished projectile is adapted,) that portion of its periphery lying between these two parts *a* and *b* being cast somewhat smaller in diameter, to avoid the necessity of turning the entire periphery or circumferential face of the said jacket B. The extreme front portion, *c*, of case B is turned or bored out true and concentric with the turned faces *a* and *b*, and a cavity in the bottom of the case B, adapted to receive the rear end of body A, is also turned out concentrically to the turned portions *a* and *b*. The said cavity, it will be seen, however, is turned out somewhat smaller than the diameter of the bore at *c*, in order that it may fit to the rear end of body A, which, it will be seen, is turned somewhat tapering from its head to its rear end, being smaller at the latter end.

It will be understood that since the body A is turned up (or finished) on its axis, and the cavity in rear end of case B and the portion *c* of its forward end, which receive and hold the body A, are turned out concentric with the portions *a* and *b*, which fit the bore of the gun, the body A will necessarily be held by the jacket or case B in a perfectly central or axial position in the bore of the gun. That portion of the interior of case B which is between the front bored portion, *c*, and the turned cavity at rear end of case is considerably larger in diameter than the body or shot A, so that an annular space is left between the exterior of body A and interior of case B, which space is filled by a belt or cylindrical shell of cement, as seen at *d*, Fig. 2, by which the case B is cemented to the body A. In the cavity at rear or base of case B there is a projecting tongue or tenon, *e*, which enters a correspondingly-shaped mortise or depression formed in the rear end of bolt A. The object of thus interlocking the bolt A and case B by means of the projection *e* and socket *f* is to effect in the body A the same twist or axial rotation which the case B may have imparted to it when used in rifled guns.

Although the bottom or base of case B is closed and fits "easily" the bore of the gun, I propose to employ in connection with it an expanding base-cup, of soft metal or other form of sabot, for the prevention of windage, such packing also serving to obtain for and impart to the case and body a rotary motion when fired from a rifled gun. The rosin or other cement seen at *d*, Fig. 2, may be poured into the case B in a plastic state (and while the case is in an upright position) in such a quantity that when the bolt A is immersed therein and forced down into its proper relative position in said case B the cement will be so displaced as to just fill the annular space between exterior of bolt A and interior of case B, as clearly shown. The tendency of the cement on becoming "set" is to hold the case B and body A fast together during their flight through the air from a gun and until the projectile strikes, and also to afford a support to the interior of case B against the action of the explosive gases on its exterior, rendering it unnecessary to make the jacket B so strong as would be otherwise necessary, when the body A and case B will become separated, the case B having added its own impact to that of bolt A when the latter strikes.

It will be seen that by making the front and rear portions, *a* and *b*, of the metallic jacket or holder B to fit to the body A, and equal in diameter to the bore of the gun, and having them united in a solid and permanent manner by the cylindrical shell portion, as shown, I produce a centering device, which, while it is light and void of any superfluous stock, is exceedingly strong from the arrangement of the stock, and is not liable to be injured by the great pressure exerted on it by the force of the gases which escape around the shot. (The destructive effect of these escaping gases is terrific, the force of the explosion being about eighty-seven thousand pounds per square inch with No. 7 powder.) With the best steel which is used for the purposes of projectiles, a bolt of a sub-caliber shot will be upset more or less in penetrating iron armor, (or plating.) This upsetting occurs just a short distance back of the head of the bolt, where a slight bulge is formed. On account of this upsetting of the bolt A it is necessary that it should be made a little tapering, so that it can pass onward and out of the jacket readily, (the upset portion being small enough to pass through the forward end of jacket,) and so that the upset portion can pass readily through the hole made by the head of the bolt.

It will be understood that I do not propose to limit my invention to the precise form of jacket shown so long as it involves a front and rear portion and a solid connecting-shell, substantially as described. Neither do I deem it vital to my invention that the precise shape of bolt shown be used—in fact, experience may show other forms of head more desirable in connection with the tapering body, as shown and described, for the purposes mentioned. In lieu of the rectangular form of projection *e* on case B and depression in rear end of bolt, (or vice versa,) any other suitable form of lug or lugs may be adopted which will so interlock the bolt A and jacket B that they must turn together, and at the same time will be free to separate longitudinally, as explained.

Having fully explained the construction and operation of my invention, what I claim as new, and desire to secure by Letters Patent, is—

The employment, in combination with the body or bolt of a sub-caliber projectile, of a metallic centering and guiding holder-case, or its equivalent, having its front and rear portions fitting the body or bolt, and adapted to fill the bore of the gun, and united by an intervening portion, in the manner substantially as set forth, for the purpose described.

In testimony whereof I have hereunto set my hand and seal this 7th day of June, 1864.

W. H. SMITH. [L. S.]

In presence of—
J. N. McINTIRE,
ANDREW J. TODD.